(12) United States Patent
Lykov

(10) Patent No.: US 9,725,918 B2
(45) Date of Patent: *Aug. 8, 2017

(54) ARRANGEMENT AND METHOD FOR UNDERWATER ACTIVITIES

(71) Applicant: WATERBOX OY, Lahti (FI)

(72) Inventor: Evgeny Lykov, Metsakyla (FI)

(73) Assignee: WATERBOX OY, Lahti (FI)

( * ) Notice: Subject to any disclaimer, the term of this patent is extended or adjusted under 35 U.S.C. 154(b) by 195 days.

This patent is subject to a terminal disclaimer.

(21) Appl. No.: 14/442,429

(22) PCT Filed: Nov. 14, 2012

(86) PCT No.: PCT/FI2012/051109
§ 371 (c)(1),
(2) Date: May 13, 2015

(87) PCT Pub. No.: WO2014/076351
PCT Pub. Date: May 22, 2014

(65) Prior Publication Data
US 2015/0345162 A1     Dec. 3, 2015

(51) Int. Cl.
*E04H 4/00* (2006.01)
*B63B 29/18* (2006.01)
*B63B 35/73* (2006.01)
*B63B 35/44* (2006.01)

(52) U.S. Cl.
CPC .............. *E04H 4/00* (2013.01); *B63B 29/18* (2013.01); *B63B 35/73* (2013.01); *B63B 2035/4426* (2013.01)

(58) Field of Classification Search
USPC ............................................................. 4/506
See application file for complete search history.

(56) References Cited

FOREIGN PATENT DOCUMENTS

| JP | 4102670 | 4/1992 |
| JP | 5248109 | 9/1993 |

OTHER PUBLICATIONS

International Search Report, dated Mar. 20, 2013, from corresponding PCT application.

*Primary Examiner* — Lauren Crane
(74) *Attorney, Agent, or Firm* — Young & Thompson

(57) ABSTRACT

An arrangement (100) for underwater activities includes a reservoir (101), which reservoir includes a wall (102) securing a space inside the reservoir (101) to be filled at least partially with water (103). The arrangement has also an opening (104a, 104b) for entering the reservoir, and a container (105) to be filled at least partially with water (103). The container receives the reservoir (101) so that the lower portion of the reservoir including at least one opening (104a) is located under the water surface level (103). The lower portion of the reservoir when introduced with the container is securing together with the container's (105) wall an upper portion (107) of the container, which upper portion (107) supports via the opening (104a) the pressure difference between the upper portion (107) of the container (105) and the space inside the reservoir (101), when water (103) is introduced into the space inside the reservoir.

17 Claims, 5 Drawing Sheets

ARRANGEMENT AND METHOD FOR UNDERWATER ACTIVITIES

TECHNICAL FIELD OF THE INVENTION

The present invention relates to an arrangement and method for underwater activities, such as underwater sports, training and scuba diving, for example. More precisely the present invention relates to an arrangement for underwater activities comprising a reservoir fully or partially filled with water, which reservoir is equipped with one or more openings for entering the reservoir and water within it.

BACKGROUND OF THE INVENTION

For humans the underwater environment is hostile and continued existence underwater require special means, mainly for providing breathing air underwater. Thus all actions taking place underwater include certain risks for humans. When these risks are combined with the natural fear that majority of humans have for deep underwater places, most people never try any kind of underwater activities.

Thus there is a need for arrangement that provide possibility for people to try out or to train various underwater activities without the major risks and fears associated to these types of activities.

Further, any activities or sports taking place underwater are somewhat problematic in view of the spectators.

SUMMARY OF THE INVENTION

An object of the invention is to alleviate and eliminate the problems relating to the known prior art. Especially the object of the invention is to provide an arrangement for easily and safely training or trying underwater activities. An additional object of the invention is to allow spectators easily follow underwater activities outside the water.

The object of the invention can be achieved by the features of independent claims.

The invention relates to an arrangement for underwater activities according to claim 1. In addition the invention relates to a method for underwater activities according to claim 14.

According to an embodiment of the invention an arrangement for underwater activities comprises a reservoir, which reservoir comprises at least one wall, such as vertical (or upwardly extending) wall(s) forming a space inside the reservoir to be filled fully or partially with water. In addition the reservoir comprises at least one opening for entering the reservoir, which advantageously locates in a lower portion of the reservoir. In addition the arrangement comprises a container to be filled at least partially with water. The container advantageously receives the reservoir so that the lower portion of the reservoir comprising the opening is located under the surface level of the body of water of said container. Furthermore the lower portion of the reservoir, when introduced within the container, forms together with the container's wall and surface level of the body of water in said container an upper portion of the container so that the upper portion supports via the opening of the reservoir's lower portion the pressure difference between the upper portion of the container and the space inside the reservoir, when water is introduced into the space inside the reservoir.

According to an exemplary embodiment the arrangement also comprises a pressure providing means for providing overpressure into the upper portion of the container so that the overpressure supplies water from the container into the reservoir via the opening of the reservoir's lower portion due to pressure difference between the upper portion of the container and the space inside the reservoir.

In addition according to an exemplary embodiment the arrangement comprises also an air-lock-type means in the connection with the container so that persons can enter the container via the air-lock-type means and again for entering the reservoir via the at least one opening of the lower portion of the reservoir.

Furthermore the walls of the reservoir are advantageously transparent, or the walls comprise at least sections that are transparent, for allowing an observation of the activities taking place inside the reservoir from outside of the reservoir.

Still according to an embodiment of the invention the arrangement may be provided with plurality of floors or decks so that the reservoir extends vertically through plurality of these floors. The reservoir may e.g. extend though all of the floors or decks of the floating structure, so that the top surface of the reservoir may be substantially even at the same level than the roof of the floating structure.

The arrangement may also comprise a horizontally extending floor structure connected to the walls of the reservoir. The floor structure may be connected to the walls of the reservoir so that the water and/or persons may move from one side of the floor structure to other through areas located at the edges of the floor structure. Alternatively the floor structure may be connected watertightly to the walls of the reservoir. The horizontally extending floor structure may also be vertically adjustable. This horizontally extending floor structure may be used to define different kinds of playing fields inside the vessel, for example.

According to an embodiment the walls of the reservoir, especially the vertically extending walls, are advantageously provided with plurality of air locks for entering and exiting the water inside the reservoir. For example, in the floating construction provided with several floors, each or many of the floors can have one or more air locks for accessing the water in the reservoir.

The arrangement may also be equipped with plurality of living quarters for providing rooms for overnight stay to people, so that the floating construction may operate as a hotel, for example. Further, the arrangement may also be equipped with premises for providing food, drinks and entertainment, such as restaurants, bars, theatres, movie theatres, for example.

For moving the floating construction on water, the arrangement is advantageously provided with a suitable propulsion system. The propulsion system may comprise one or more propellers with engines for rotating them. The propulsion system may comprise one or more azimuth-type thrusters, for example. Alternatively the arrangement may be moved on water with tug-boats for example.

The arrangement is also advantageously equipped with an anchoring system for securing the arrangement at a suitable place or location on water. The anchoring system may comprise one or more anchors connected to the floating arrangement with wires or chains, and winches for raising and lowering the anchors. Alternatively the anchoring system may comprise fixed anchoring bases on bottom of a larger body of water, such as lake, sea, ocean or river for example, which anchoring base or bases may be used for securing the floating construction.

For moving people to and from the arrangement when it is floating, the roof of the floating arrangement may be equipped with an airstrip and/or a helipad. Alternatively or additionally the floating structure may be equipped with fixed or detachable docking facility for allowing passengers to enter and exit the floating arrangement.

The present invention offers many advantages over the known prior art, such as allowing easy and safe training or trying for underwater activities, as well as allowing spectators to easily follow underwater activities outside the water. Moreover according to the invention one can train or try underwater activities within the high transparent reservoir, so i.e. diving upwards over the sea or ground level and somehow "climb" at the same time. Thus one can train, try or feel both the natural fear of deep underwater places as well as of high places due to transparent walls of the reservoir.

In this document the verb "to comprise" is used in this document as an open limitation that neither excludes nor requires the existence of unrecited features. The features recited in depending claims are mutually freely combinable unless otherwise explicitly stated.

BRIEF DESCRIPTION OF THE DRAWINGS

Next the invention will be described in greater detail with reference to exemplary embodiments in accordance with the accompanying drawings, in which.

DETAILED DESCRIPTION

Figure 1:
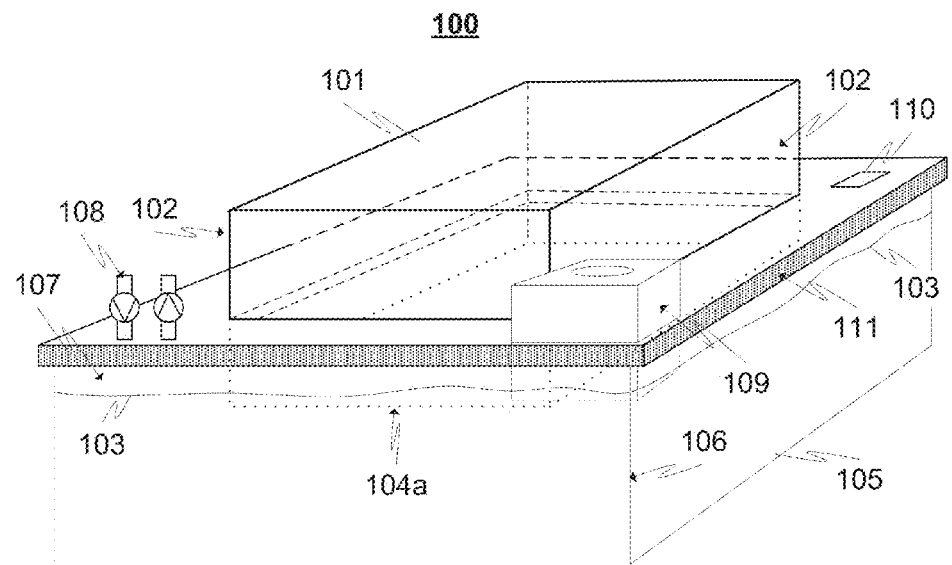
FIG. 1 illustrates a principle of an exemplary arrangement for underwater activities according to an advantageous embodiment of the invention.
Figure 2A:
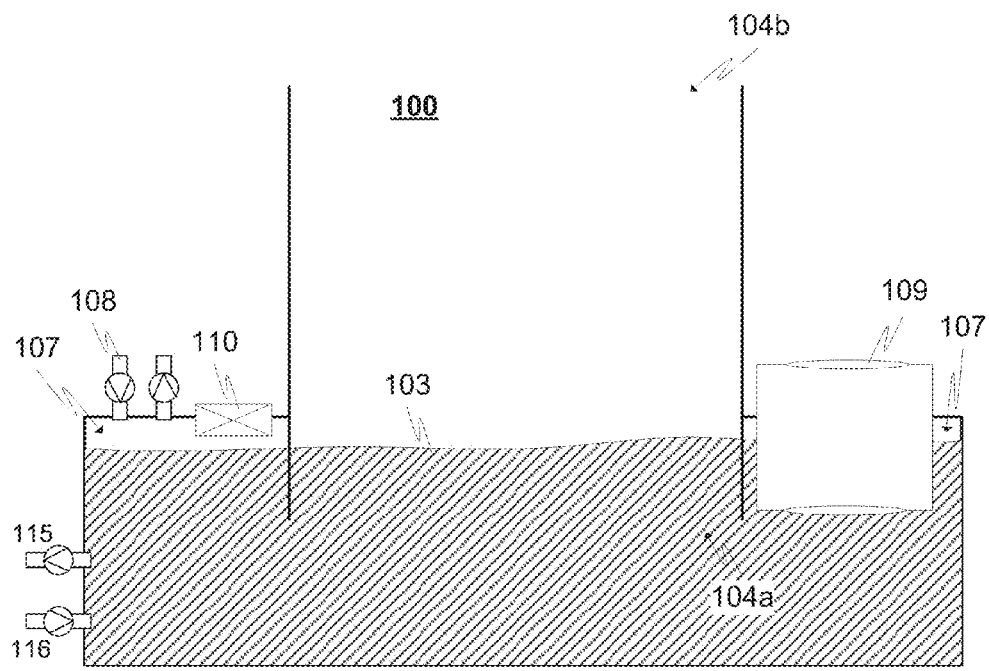
FIGS. 2A-2C illustrate side views of an exemplary arrangement for underwater activities when filled with water according to an advantageous embodiment of the invention.
Figure 2B:
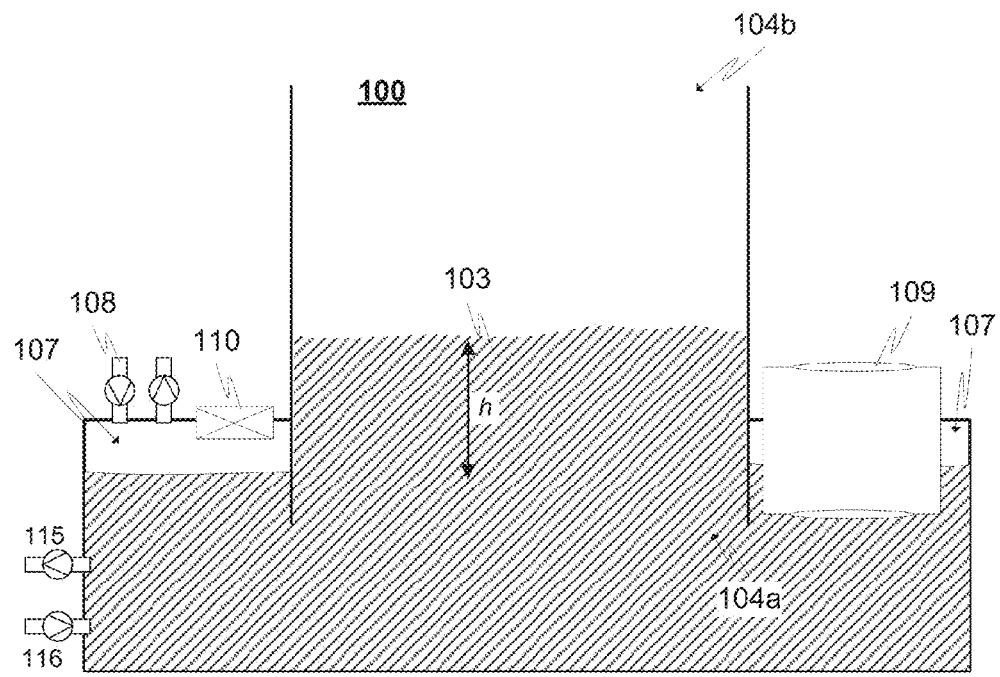
Figure 2C:
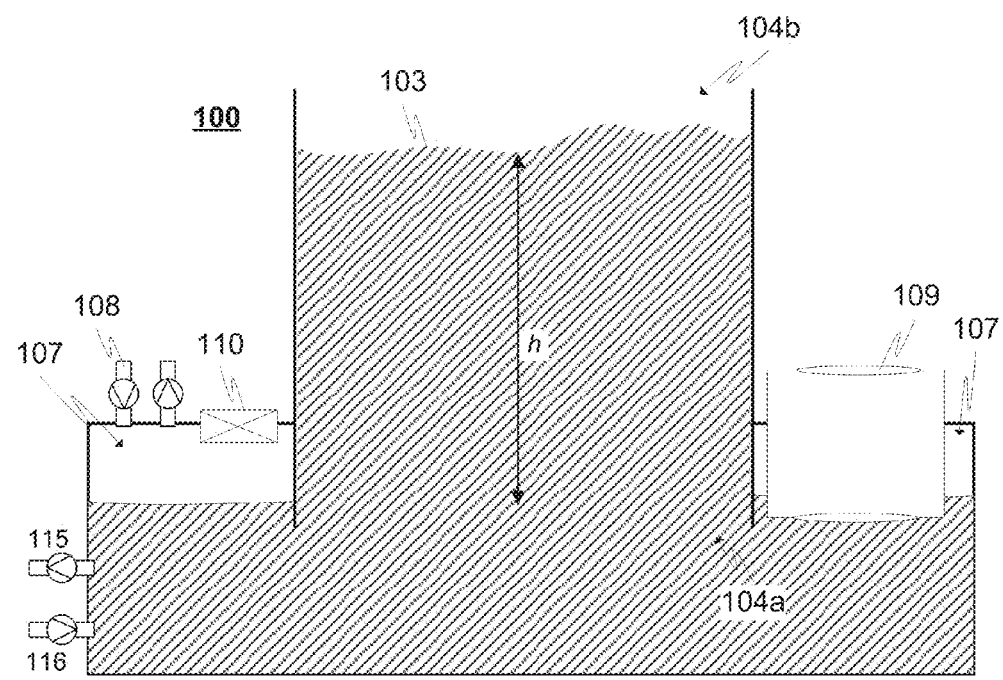

FIG. 1 as well as FIGS. 2A-2C illustrate a principle of an exemplary arrangement 100 for underwater activities according to an advantageous embodiment of the invention, where the arrangement comprises a reservoir 101, and where the reservoir comprises vertical walls 102 securing a space inside the reservoir 101 to be filled fully or partially with water 103.

In addition the reservoir 101 comprises at least one opening 104a, 104b for entering the reservoir. At least one of the openings 104a is advantageously located in a lower portion of the reservoir. In addition the arrangement comprises a container 105 to be filled at least partially with water 103. The container advantageously receives the reservoir so that a lower portion of the reservoir with the opening 104a is located under the surface level of the body of water 103 of said container 105. Furthermore the lower portion of the reservoir 101, when introduced within the container 105, forms together with its walls below surface level of the body of water 103 and the container's wall 106 and surface level of the body of water 103 in said container 105 an upper portion 107 of the container so that the upper portion 107 supports via the opening 104a of the reservoir's lower portion the pressure difference between the upper portion 107 of the container and the space inside the reservoir 101, when water is introduced into the space inside the reservoir 101 (as is done in FIGS. 2B, 2C by increasing the pressure in the portion 107).

The arrangement 100 may also comprise a pressure providing means 108 for providing overpressure into the upper portion 107 of the container 105 so that the overpressure supplies water 103 from the container 105 into the reservoir 101 via the opening 104a of the reservoir's lower portion due to pressure difference between the upper portion 107 of the container and the space inside the reservoir 101. The pressure providing means 108 may be double-acting-type so that it can be used for increasing the pressure in the portion 107 and thereby for raising the level of water in the reservoir 101, but also increasing the pressure in the portion 107 and thereby for lowering the level of water in the reservoir 101. In addition the pressure providing means 108 can be used for removing/feeding air from/to the container.

FIG. 2A illustrates a situation where there is no pressure essential difference between the upper portion 107 of the container 105 and the space inside the reservoir 101, whereupon the surface level 103 of the body of water 103 in the container 105 as well as in the reservoir 101 is essentially at the same level. However, when the overpressure is generated into the upper portion 107 of the container 105 (e.g. by the a pressure providing means 108) the overpressure forces water 103 from the container 105 into the reservoir 101 via the opening(s) 104a of the reservoir's lower portion due to the pressure difference, whereupon the surface level 103 of the body of water 103 in the reservoir 101 raises (and proportional to the pressure difference) than in the container 105 (see FIG. 2B). Again the higher the overpressure generated into the upper portion 107, the higher the surface level 103 of the body of water 103 in the reservoir 101 is raised, as can be seen in FIG. 2C.

The relationship between the pressure difference and the height of the water level in the reservoir can be expressed by the formula:

$$\Delta P = \rho g h$$

wherein $\Delta P$=pressure difference, $\rho$=density of water [1000 kg/m$^3$], g=acceleration of gravity [9.81 m/s$^2$], and h=height of the water level.

As an example about 5 m height for the surface level 103 of the body of water 103 in the reservoir 101 can be reached when the overpressure in the upper portion 107 of the container 105 is about 0.5 bar in relation to the pressure at the top of the surface level 103 of the body of water 103 in the reservoir 101. Correspondingly about 1.0 bar overpressure is capable for raising the surface level 103 of the body of water 103 in the reservoir 101 about to 10 m, and 1.0 bar overpressure to 20 m, correspondingly.

The arrangement may also comprise an air-lock-type means 109 in the connection with the container 105 (and/or with the reservoir 101) so that persons can enter the container 105 (and/or with the reservoir 101) via the air-lock-type means and again for entering the reservoir 101 from the container 105 via the opening 104a in the lower portion of the reservoir 101.

According to an embodiment the walls 102 of the reservoir 101 are advantageously transparent, or the walls 102 comprise at least sections that are transparent, for allowing an observation of the activities taking place inside the reservoir 101 from outside of the reservoir.

Even though the arrangement 100 comprises the opening(s) 104a in the lower portion of the reservoir 101

(reaching into water of the container 105), the arrangement may also comprise another opening(s) 104b e.g. in the upper portion of the reservoir 101 so that person can also enter to the reservoir 101 via its upper portion (like jumping into water 103 of the reservoir 101).

The upper surface of the container 105 is advantageously equipped with closable opening 110, which can be used emergency emptying of the reservoir. When the closable opening 110 is opened, the overpressure is discharged and thus water is emptied from the reservoir 101 back to the container 105.

The arrangement with the reservoir 101 as well as with the container 105 may be connected to a floating platform 111. In this exemplary embodiment the floating platform 111 may support the reservoir 101 and the container 105 and keep them floating above a suitable body of water such as a lake or river or sea, for example.

The floating platform 111 is advantageously large enough to provide a room for spectators observing activities taking place inside the water filled reservoir 101. The floating platform 111 can be equipped with seatings for spectators and can be made large enough to include suitable facilities for providing food and beverages to the spectators as well as other services, for example. The floatability of the floating platform 111 can be achieved e.g. with suitable floatable material of the floating platform and/or with pontoons and floats.

In addition the arrangement may comprise means 114 for filling the container 105 with water, means 115 for removing water from the container.

Figure 3:
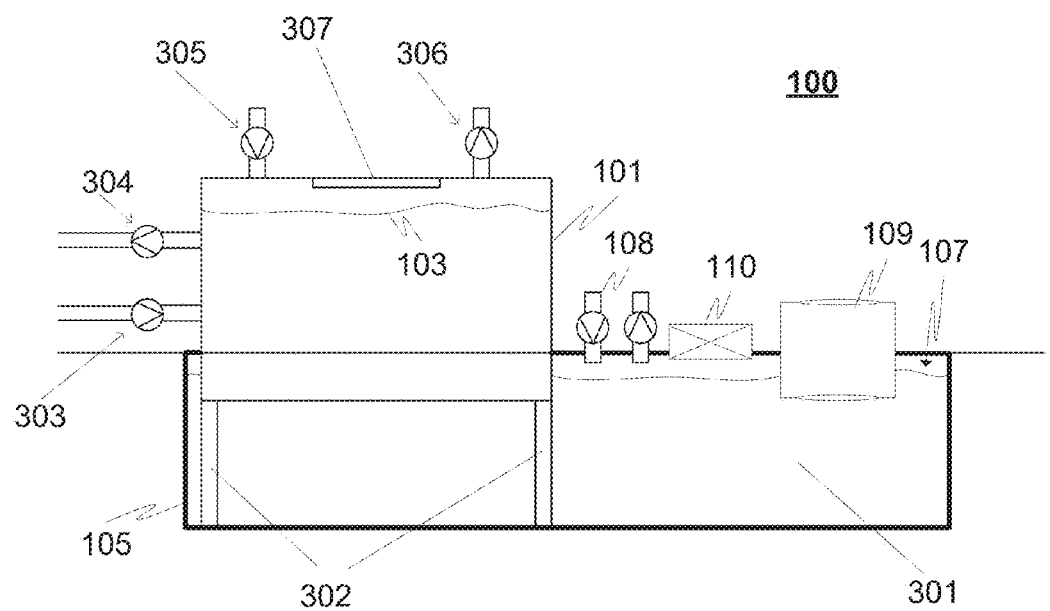
FIG. 3 illustrates a schematic view of an arrangement for underwater activities according to an alternative embodiment of the invention.

FIG. 3 illustrates a schematic view of an arrangement 100 for underwater activities according to an alternative embodiment of the invention, where the reservoir 101 comprise a closed top portion, i.e. there is no open opening in the upper portion of the reservoir as is the case in FIGS. 2A-2C, for example. In addition the reservoir 101 is located partially inside a covered "swimming pool" 301 (or container) forming also the corresponding upper portion 107 as in connection with FIGS. 1 and 2A-2C. In this embodiment the reservoir 101 made of transparent material is filled partially with water 103 and supported with support structure, in this case with legs 302, on the bottom of the covered swimming pool 301. The reservoir 101 has the lower surface located under the water level of the covered swimming pool 301 open in order to allow entrance inside the reservoir and water located inside. In this context the partial filling of reservoir 101 with water 103 means that the surface level of the water inside the reservoir is substantially higher than the water level of the surrounding body of water in order to provide suitable amount of water inside the reservoir for underwater activities.

The reservoir 101 may be filled fully or partially with water with a water inlet pipe and pump 303, and the water inside the reservoir is drained with an outlet pipe and pump 304, when the reservoir is filled fully or partially with water in order to create water circulation inside the reservoir. When the reservoir 101 is drained from water, both pipes and pumps 303 and 304 can be used in this process, simply by changing the pumping direction with relevant pump in inlet direction. The outlet pipe and pump 304 can similarly be used for filling the reservoir 101 with water.

The upper surface of the reservoir 101 is equipped with inlet and outlet air ducts and pumps 305, 306. The outlet air duct and pump 306 is required for creating partial vacuum or underpressure inside the reservoir 101 when the reservoir is filled with water so that the water will remain inside the reservoir and not flow out of there. When suitable water level inside the reservoir 101 is reached, the inlet air duct and pump 305 is activated in order to keep the suitable water level inside the reservoir and provide changing air inside the unfilled portion of the reservoir. Simultaneously, either the water inlet pipe and pump 303 is turned off, or the water outlet pipe and pump 304 is activated.

The upper surface of the reservoir 101 is also equipped with closable opening 307, which can be used emergency emptying of the reservoir, or to help emptying the reservoir when it is otherwise drained through the water pipes and pumps 303 and 304, for example. In this case (emergency emptying) also the closable opening 110 is opened in order to remove the pressure difference and emergency emptying water from the reservoir into the container, or the swimming pool 301 in FIG. 3.

Figure 4A:
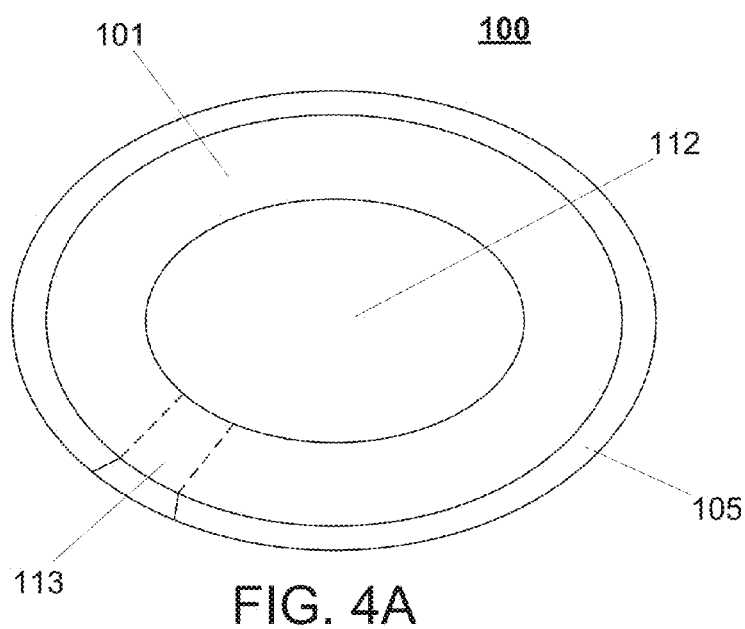
FIGS. 4A, 4B illustrate schematic top views of two exemplary reservoirs for an arrangement for underwater activities an advantageous embodiment of the invention.
Figure 4B:
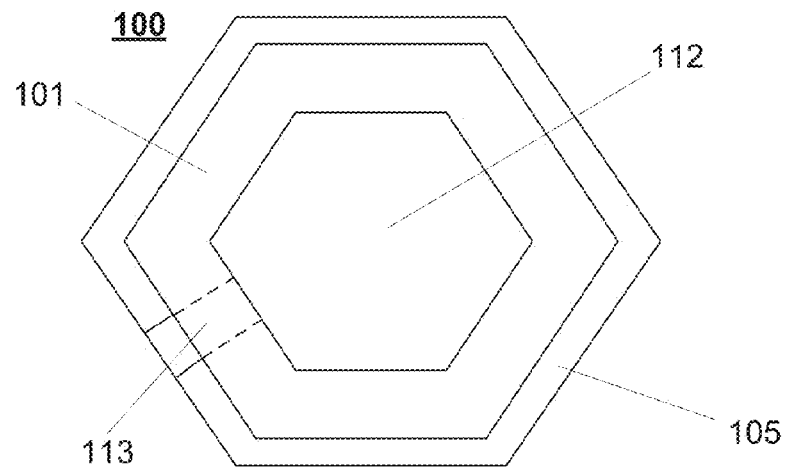

FIGS. 4A and 4B illustrate schematic top views of two exemplary reservoirs 101 of an arrangement 100 for underwater activities according to an advantageous embodiment of the invention. In the embodiments of these figures, the reservoirs 101 to be at least partially filled with water (similarly as in FIGS. 1, 2A-2C and 3, for example), formed as circular or angular entities, define an open room 112 in the middle for spectators, in addition to the room surrounding the reservoir. Next to the outer edge of the reservoir 101 there is arranged the container 105 with the opening 104a in its lower portion (not shown in FIGS. 4A, 4B) for entering the fully or partially water filled reservoir and supporting the pressure difference between the upper portion of the container and the reservoir, as described with the reference number 107 in connection with FIGS. 1 and 2A-2C above.

Passage 113 is arranged for entering the open room 112 in the middle of reservoir 101, which passage advantageously comprise a bridge over the container 105 and a tunnel through the reservoir 101.

Figure 5A:
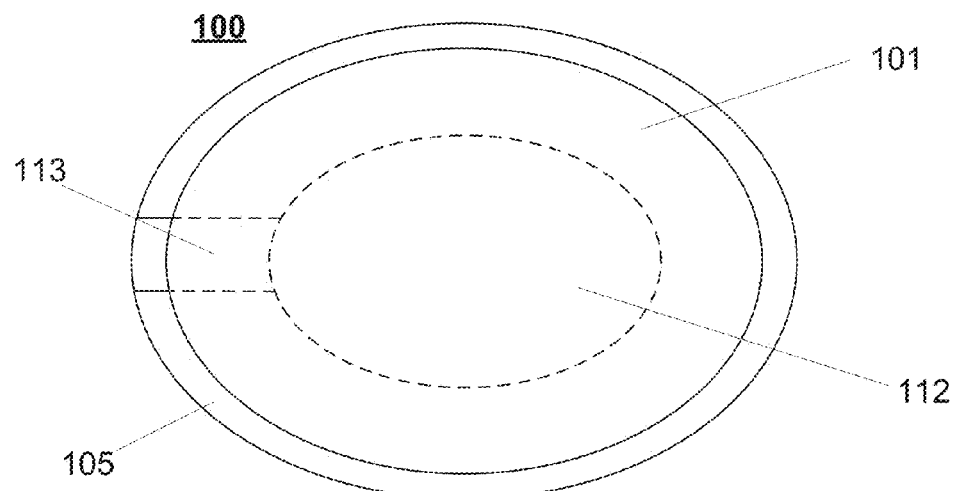
FIGS. 5A, 5B illustrate schematically an arrangement for underwater activities according to another alternative embodiment of the invention, and FIG. 6 illustrate an exemplary floating arrangement for underwater activities according to an embodiment of the invention.
Figure 5B:
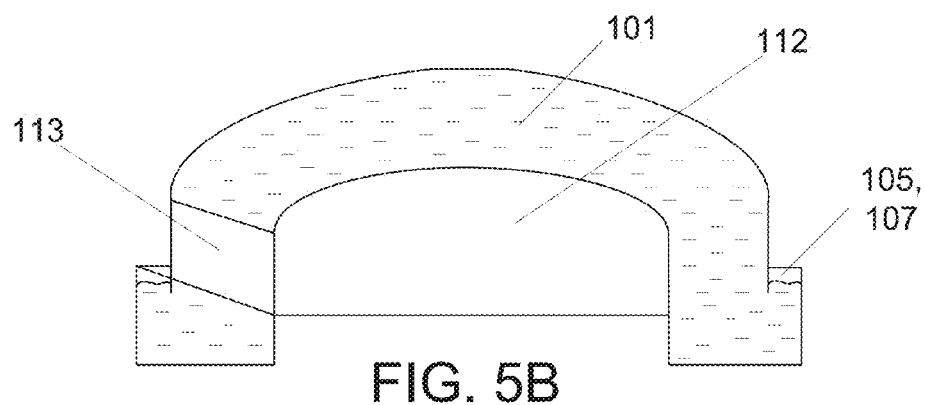

FIGS. 5A and 5B illustrate schematically an arrangement 100 for underwater activities according to another alternative embodiment of the invention. FIG. 5A shows a schematic top view of the arrangement 100, and FIG. 5B shows a schematic cross-sectional side view of the arrangement 100. In these embodiments the reservoir 101 covers an inner room 112 for spectators. A peripheral of the lower portion of the reservoir 101 is surrounded with the container 105 (similarly as in FIGS. 2A-2B, for example) with the opening 104a (not shown in FIGS. 5A, 5B) for entering the fully or partially water filled reservoir 101. The passage 113 is provided for spectators for entering the inner room 112, which passage goes over the container 105 and through the reservoir 101 to the inner room.

The arrangement 101 may thus comprise the room 112 for spectators surrounded by and/or covered by the reservoir 101. Also according to an embodiment inside the wall of the reservoir 101 there might be provided a room for spectators.

Figure 6:
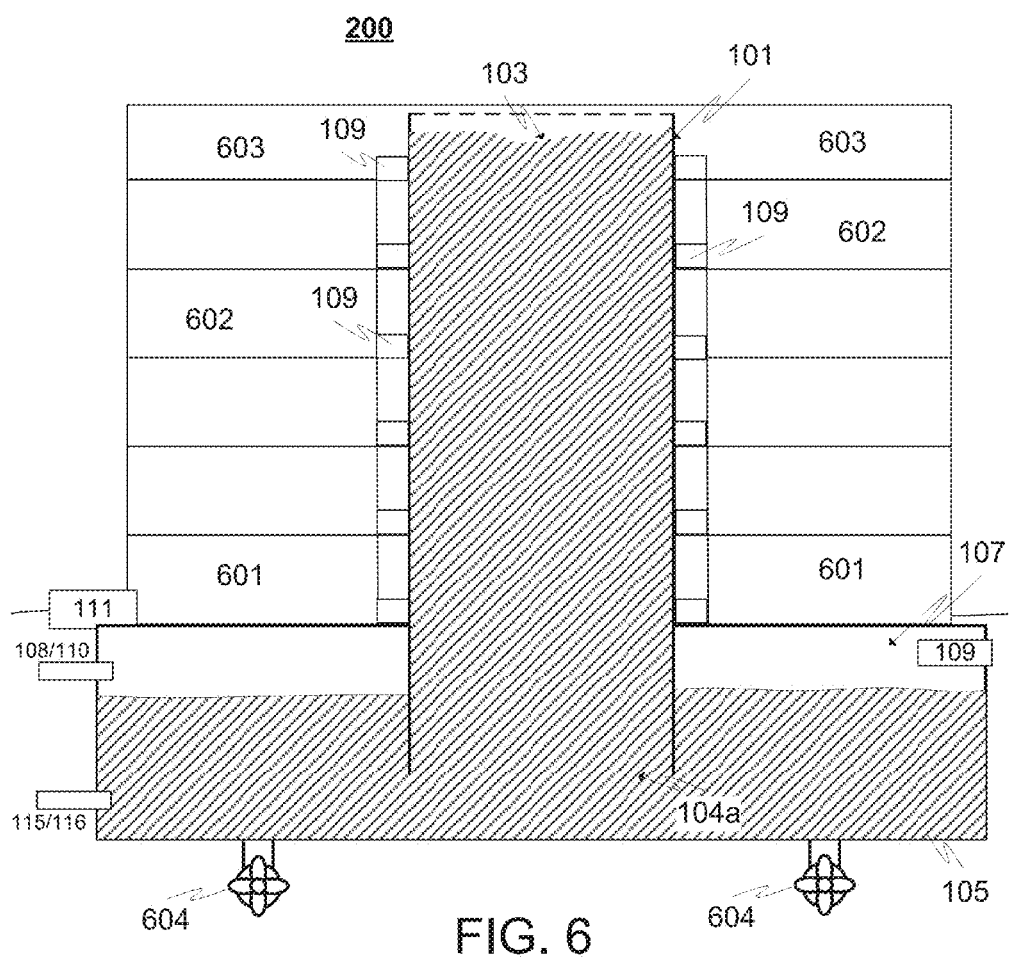

FIG. 6 illustrate an exemplary floating arrangement 200 for underwater activities according to an embodiment of the invention, where the floating arrangement or arrangement 200 comprises a reservoir 101 surrounded by plurality of floors or decks. At least some of the floors of the floating arrangement 200 comprise rooms or other space 601 around and next to the reservoir 101, from where the activities taking place inside the reservoir can be observed through transparent walls or transparent portions of walls of the reservoir. These spaces 601 can be equipped with chairs or other seating arrangements, like in theatres or movie theatres for examples.

At least some of the floors of the floating arrangement 200 also comprise living quarters 602 in the form of hotel rooms, for example, where the passengers or visitors can stay overnight.

The top floor 603 of the floating arrangement 200 may be equipped with restaurants, bars, casinos and other facilities taking care of the needs of the visitors or passengers.

The floating arrangement 200 advantageously comprises in additionally at least means 108, 110, 115, 116 and also possible other means required to keep the floating arrangement in an operating condition, including power and electricity generation, air conditioning, as well to generate the pressure difference between the upper portion 107 of the container 105 and into the reservoir 101 so that the level water in the reservoir 101 can be raised high enough. The bottom floor of the floating device may be provided with facilities required for providing different kinds underwater shows or sporting events inside the reservoir 101.

From the bottom surfaces of the floating arrangement there may extend an azimuth propulsion arrangement 604 used to move and steer the floating arrangement on the water. The underwater portion of the floating arrangement may also comprise an anchoring system comprising anchoring wires or chains, which are used in anchoring the floating arrangement on the water.

The arrangement 200 may be provided with air locks 109, which allow entrance to and exit from the water inside the reservoir 101.

The floating arrangement 200 may also be equipped with fixed or detachable docking platform 111, which allows ships, boats, hydroplanes etc. to dock to the floating arrangement for transporting passengers and/or visitors to and from the floating construction. For transporting passengers and visitors, the level top surface or roof of the floating arrangement 200 can be equipped with airstrip or helipad.

As can be seen from the above discussion of the embodiments shown in attached Figures, the arrangement according to the present invention can be implemented as a single floating construction, as a combined construction with an already existing (covered) pool of water on ground, or as a single constructional entity comprising surrounding covered pool (container) or body of water. For example, the embodiments of FIGS. 1, 5A and 5B can be a floating entity or it can be single constructional entity build on ground and comprising a covered pool (i.e. container) for required surrounding body of water. Furthermore it is to be noted that the top (upper portion) of the reservoir 101 may either be closed or open (with opening 104*b*), for example.

Thus it is evident that any of the above discussed embodiments, or variations of these embodiments, or combinations of these embodiments, evident to a person skilled in the art can be applied as floating constructions or as structures located on ground comprising a suitable (covered) pool or body of water, for example.

The specific exemplifying embodiments of the invention shown in Figures and discussed above should not be construed as limiting. It is evident to a person skilled in the art that the reservoir can be made of any suitable shapes and sizes, and of any suitable transparent material. Further, the required transparency can alternatively be achieved by providing transparent parts or sections in the walls of the reservoir. Also, a suitable room for spectators can also be provided inside the wall of the reservoir. Thus, the invention is not limited merely to the embodiments described above.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims.

The invention claimed is:

1. An arrangement for underwater activities comprising a reservoir, which reservoir comprises at least one wall and at least one opening for entering the reservoir, wherein the reservoir is configured to be filled fully or partially with water, wherein the arrangement comprises additionally a container to be filled at least partially with water, wherein said container is configured to receive said reservoir so that the lower portion of the reservoir comprising at least one opening is to be located under the surface level of the body of water in said container, wherein said lower portion of the reservoir when introduced within the container is configured to form together with the container's wall an upper portion of the container, which upper portion is configured to support via said opening of the reservoir's lower portion the pressure difference between said upper portion of said container and the space inside the reservoir, when water is introduced inside the reservoir.

2. The arrangement according to claim 1, wherein the arrangement comprises a pressure providing device for providing overpressure into the upper portion of said container so that the overpressure is configured to supply water from the container into the reservoir via said opening of the reservoir's lower portion due to pressure difference between said upper portion of said container and the space inside the reservoir.

3. The arrangement of claim 1, wherein the arrangement comprises an air-lock-type device in the connection with the container for entering the container via said air lock and again for entering the reservoir via said at least one opening of the lower portion of the reservoir.

4. The arrangement of claim 1, wherein at least one of the walls of the reservoir is transparent, or the walls comprise section that is transparent, for allowing observation of the activities taking place inside the reservoir from outside of the reservoir.

5. The arrangement of claim 1, wherein the upper portion of the reservoir comprises at least one open opening for entering the reservoir.

6. The arrangement of claim 1, wherein the upper portion of the reservoir is closed, and wherein the arrangement comprises an air removing device for removing air from the upper portion of the reservoir, and an air feeding device for feeding air to the upper portion of the reservoir.

7. The arrangement of claim 1, wherein the arrangement comprises a filling device for filling the reservoir or the container with water, a water removing device for removing water from the reservoir or the container, an air removing device for removing air from the container, and an air feeding device for feeding air to the container.

8. The arrangement of claim 1, wherein the arrangement comprises or wherein the container is configured to function as a floating platform connected to the reservoir or the container, and therefore supports the reservoir or container and keeps the reservoir and/or container partially above surface level of the body of water, and wherein the floating platform provides also a room for spectators.

9. The arrangement of claim 1, wherein the arrangement comprises a room for spectators surrounded by or covered by the reservoir.

10. The arrangement of claim 1, wherein the reservoir or container is equipped with a device for allowing water to quickly escape from the reservoir.

11. The arrangement of claim 1, wherein inside the wall of the reservoir or the container there is provided a room for spectators.

12. The arrangement of claim 1, wherein the arrangement comprises a plurality of horizontally extending floors, and the reservoir extends vertically through the plurality of said floors.

13. The arrangement according to claim 12, wherein the arrangement comprises a plurality of living quarters.

14. Method for underwater activities, the method comprising a step of filling a space with fully or partially with water, the space being formed by at least one wall of a reservoir, said reservoir having at least one opening for entering the space inside said reservoir, wherein the method comprises additionally
   filling a container at least partially with water, receiving said reservoir into the container so that the lower portion of the reservoir comprising at least one opening is located under the surface level of the body of water in said container,
wherein said lower portion of the reservoir when introduced within the container forms together with the container's wall an upper portion of the container, which upper portion thereby supports via said opening of the reservoir's lower portion the pressure difference between said upper portion of said container and the space inside the reservoir, when water is introduced into the space inside the reservoir.

15. The method according to claim 14, wherein overpressure is provided into the upper portion of said container so that the overpressure supplies water from the container into the reservoir via said opening of the reservoir's lower portion due to pressure difference between said upper portion of said container and the space inside the reservoir.

16. The method according to claim 14, wherein an air-lock-type device is coupled with the container for entering the container via said air-lock-type device and again for entering the reservoir via said at least one opening of the lower portion of the reservoir.

17. The method according to claim 15, wherein an air-lock-type device is coupled with the container for entering the container via said air-lock-type device and again for entering the reservoir via said at least one opening of the lower portion of the reservoir.

* * * * *